Aug. 16, 1966   W. McADAM ETAL   3,267,374
NULL TYPE MULTIRANGE MEASURING SYSTEM WHICH MAINTAINS
CONSTANT SENSITIVITY THROUGHOUT THE SEVERAL RANGES
Filed June 28, 1962                              2 Sheets-Sheet 1 ically, while its system is advantageous, it leaves something to
United States Patent Office 3,267,374
Patented August 16, 1966

3,267,374
NULL TYPE MULTIRANGE MEASURING SYSTEM WHICH MAINTAINS CONSTANT SENSITIVITY THROUGHOUT THE SEVERAL RANGES
Will McAdam, Blue Bell, and Raymond E. Tarpley, Cornwell Heights, Pa., assignors to Leeds and Northrup Company, Philadelphia, Pa., a corporation of Pennsylvania
Filed June 28, 1962, Ser. No. 205,961
12 Claims. (Cl. 324—99)

This invention relates to electrical measuring systems of the null type suited for the measurement of small voltages and particularly for currents of a low order as in the range of micromicroamperes and above, and has for an object an arrangement for maintaining constant for different measuring ranges either or both the damping and sensitivity of the system.

The present invention provides significant improvements over prior systems, such for example as disclosed in U.S. Letters Patent 2,547,105 to Albert J. Williams, Jr. Advantage is here taken of his system in which a measuring network of the null type at balance appears to a source of unknown current as a short circuit between the junctions and, hence, the measurement of the current is unaffected by the resistances in the measuring network. While his system is advantageous, it leaves something to be desired in providing uniformity of sensitivity for different ranges of measurement, and likewise, in providing in a simple manner uniformity of damping for different ranges of measurement, particularly for current sources having low internal resistances. For example, to increase the sensitivity of response of his system, he proposes to increase the value of his resistor 13 until until the resistance between the junction points 33 and 34 may be made infinitely high, as for example, by omission of his resistor 13. The difficulty is that such increase in sensitivity also depends upon the internal resistance of the phototube.

It is an object of the present invention to provide a measuring system in which for the lowest range of measurement the sensitivity may be made quite high and that sensitivity maintained constant through a plurality of higher ranges of measurement from sources whose internal resistances may be low, much lower than for phototubes and including sources of barrier layer type.

In carrying out the present invention in one form thereof, there is provided an electrical measuring system for the null measurement through a plurality of different ranges of electrical inputs to the measuring circuit which may be either current or voltage. The system is characterized by the provision of two meshes, the first mesh including at least a part of a calibrating resistance means together with a detector resistance means, the latter being connected across the input circuit of conventional detecting means. The second mesh includes the electrical source, the output of which is to be measured, at least the said part of the calibrating resistance means and a variable source of voltage controlled in response to the output of the detecting means for accomplishing the null measurement. In conjunction with the foregoing, there is provided a means for changing the range of measurements by changing the magnitude of the calibrating resistance means and for concurrently changing the magnitude of the detector resistance means which is included in the first mesh by amounts which maintain substantially constant the signal transmission characteristics between said voltage-varying means and said detector resistance means.

In preferred forms of the invention, the foregoing signal transmission characteristic may be either the direct current characteristic or the alternating current characteristic, the latter arising by reason of inclusion in the input circuit of an RC filtering network together with a capacitor connected to the variable source of voltage and thus forming a capacitance damping means. The magnitude of the damping signal may be maintained constant for corresponding rates of change of the variable source of voltage throughout the several ranges of measurement selected as above described.

For further objects and advantages of the invention and for a more detailed understanding thereof, reference is to be had to the following description taken in conjunction with the accompanying drawings, in which.

Figure 1:
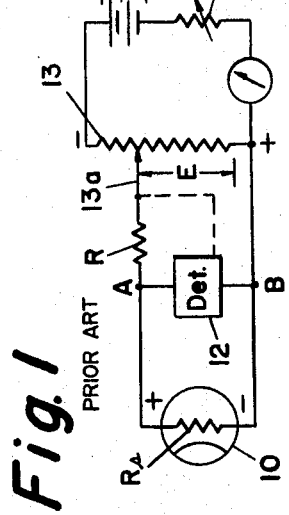
FIGS. 1 and 2 are wiring diagrams useful in explaining the prior art and in reference to which the principles of the present invention may be better grasped.
Figure 2:
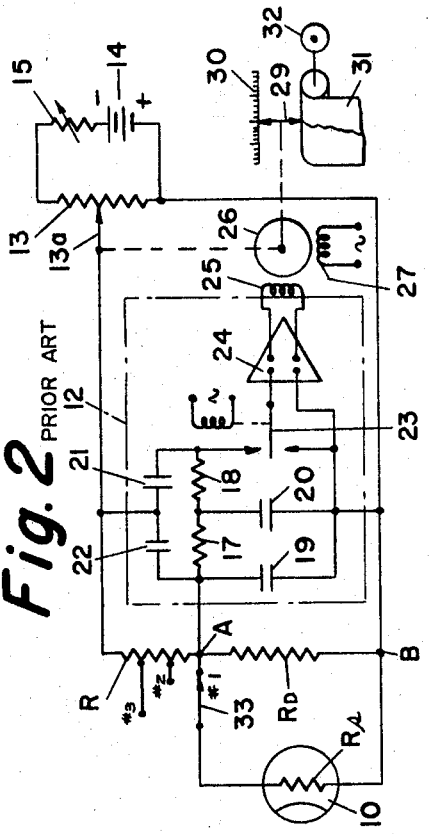

Referring now to FIG. 1, the present invention includes certain of the techniques explained in said Williams Letters Patent 2,547,105, and in particular that of making the measurement under such conditions that the phototube 10 is looking into a measuring circuit which appears to it as a short circuit, and hence, there is attained a true measurement of the current from the phototube unaffected by the resistance of the measuring network. This result is accomplished by providing a calibrating resistor R in series with the photocell 10 and a variable voltage source shown as a potentiometer including a slidewire 13 having an adjustable contact 13a. The potentiometer, of the slidewire resistor type, is powered from any suitable source of direct current, as from a battery 14, and there may be included in series therewith a rheostat 15 for producing a predetermined current flow through the slidewire resistor 13. A detector 12 is connected between the points A and B of the measuring network. The voltage E derived from the potentiometer has a polarity in series-aiding relationship with the polarity of the photocell 10. Accordingly, when the voltage E is adjusted by detector 12 to a predetermined value, all of the current from the photocell 10 will flow through a circuit excluding the detector 12. It is in this manner that the photocell 10 effectively looks into a measuring circuit which appears as a short circuit. Thus, the detector 12 responds to a difference in the currents flowing in the source 10 and in calibrating resistor R and adjusts contact 13a in a direction to reduce said difference to zero.

Where the current ranges are to be changed, a system like that of FIG. 2 will be utilized and the measuring system as shown by said Williams patent will preferably include a detector 12 having an RC filtering network including filtering resistors 17 and 18 and filtering capacitors 19 and 20. The detector will also include damping capacitors 21 and 22 with a vibrator 23 for developing an alternating current input signal for an amplifier 24, the output of which is applied to a control winding 25 of a motor 26 also provided with a power winding 27 energized from the same source of alternating current supply as the driving coil for vibrator 23. The motor 26 is arranged to drive the movable contact 13a of slidewire 13 for the purposes already set forth. The motor also is arranged to drive a pen index 29 associated with a scale 30 and a chart 31 of a suitable exhibiting instrument of conventional type, the chart being driven by a motor 32. The input terminals A and B of said detector 12 have connected across them a detector resistor $R_D$. The connection from the phototube 10 to the calibrating resistor R is by way of a movable contact 33 adjustable to a plurality of tap positions on the calibrating resistor R. For current measurements of the lowest order, the contact 33 will be in its illustrated position. To increase the range, it will be moved to its second or third positions. With each change of range, the D.C. and A.C. transmission characteristics between the variable voltage source comprising the potentiometer slidewire 13 and the input terminals A and B will differ and the magnitude of the difference will be greater for low values of the internal resistance $R_s$ of the phototube 10. In the case of barrier layer cells, phototubes of the current output type, the internal resistance will frequently and ordinarily be of a relatively low order.

Figure 3:
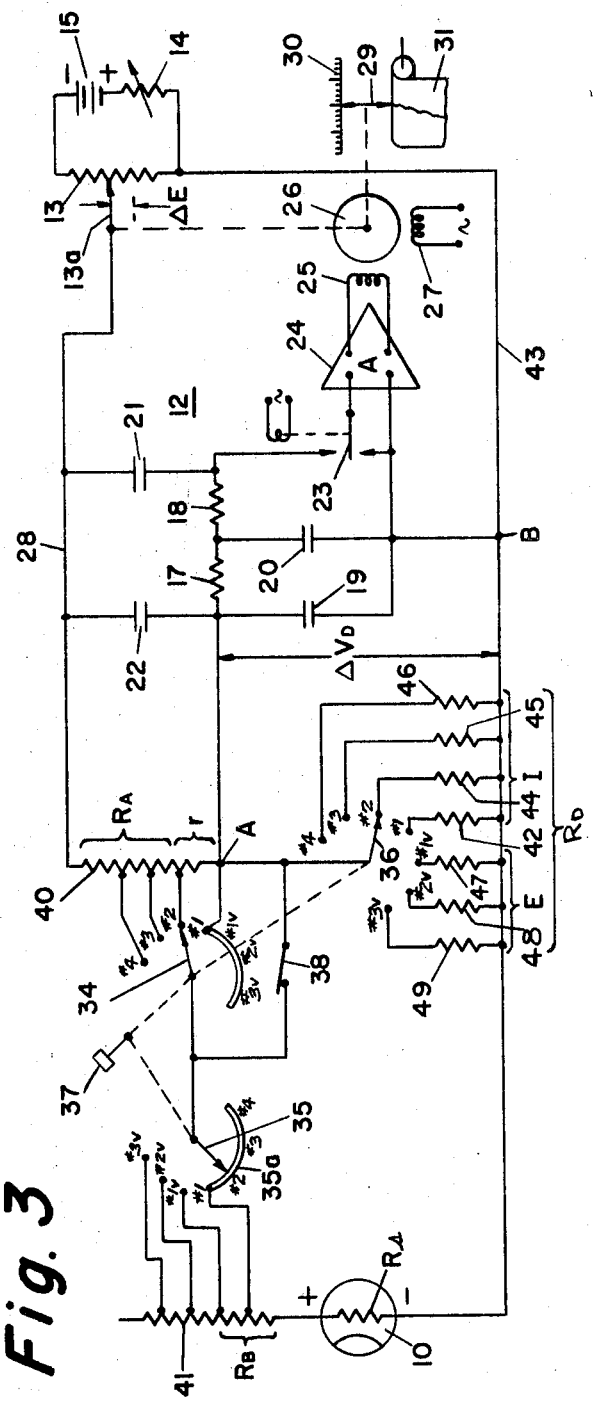
FIG. 3 is a wiring diagram of one preferred form of the invention.

In accordance with the present invention, and as particularly illustrated in FIG. 3, there is attained a substantially constant transmission characteristic between the variable voltage source formed by the potentiometer slidewire 13 and the input terminals A and B of the measuring network. This constancy may be attained for either the direct current transmission characteristic or the alternating current transmission characteristic.

For reasons later to be explained, the calibrating or range-determining resistance means comprises precision resistors 40 and 41 each provided with a plurality of taps and having associated contacts 34 and 35 for selectively completing connections thereto.

With the contact 34 in its illustrated second position, it will be noted that the lower section $r$ of the precision resistance means 40 is effectively eliminated from the circuit by reason of a short-circuit connection completed by way of contact 34 and a closed manually operable switch 38. However, the section $R_A$ is included in a first mesh circuit which may be traced from the movable contact 13a of the variable voltage source by way of conductor 28, section $R_A$, contacts 34 and 38, contact 36, and a resistor 44 forming a part of a detector resistance means $R_D$, and by way of conductor 43 to the other side of the variable voltage source of supply. The detector 12, including the filtering network 17–20 and the amplifier 24, is connected between the points A and B. Damping capacitors 21 and 22 extend from one side of the input circuit of the amplifier 24 to the conductor 28 leading to adjustable contact 13a of the variable voltage source of supply.

The calibrating resistor 40 is also included in a second mesh which may be traced from the positive side of the barrier layer cell 10 by way of contact 35, contact 34, the upper section $R_A$ of the calibrating resistor 40, conductor 28, the contact 13a of the variable voltage source, thence through the lower part of slidewire 13 and by way of conductor 43 to the other side of the barrier layer cell 10. For the lowest range of measurement, the contacts 34, 35 and 36, ganged together and operable by a common knob 37, will be moved to their first or No. 1 positions, and for current ranges higher than for the one illustrated, to their third and fourth positions. Throughout all of the foregoing ranges the contact 35 will be movable along a conducting segment 35a, and hence, the calibrating resistor 41 will be excluded from the current-measuring circuits traced above. It will be utilized as later explained for voltage measurements of a low order.

In accordance with the present invention, the value of the section $R_A$ of the calibrating resistor 40 included in the circuit determines the range of currents to which the instrument will respond, and these ranges may be selected as desired. The values of each of the detector resistors 42, 44, 45 and 46 are concurrently determined in accordance with the following relationship in order to achieve a constant or uniform sensitivity of the detecting means 12 comprising the amplifier 24 and its associated motor 26 for all ranges of the measuring system:

$$K_{DC} = \frac{\Delta V_D}{\Delta E} = \frac{R_s R_D}{R_A(R_s + R_D) + R_s R_D} \qquad (1)$$

where $K_{DC}$ is the direct current transmission constant to be maintained at a uniform value;

$\Delta V_D$ is the incremental voltage across points A and B developed by an incremental change $\Delta E$ resulting from a predetermined movement of contact 13a of slidewire 13;

$R_s$ is the internal resistance of the barrier layer cell 10;

$R_D$ is the resistance of the resistor included in the circuit by contact 36;

$R_A$ is the resistance of that part of the range-determined resistor 40 included in the second mesh circuit traced above; and the input resistance of the detector 12 is high compared with the combination of $R_D$ and $R_s$.

Since the value $R_A$ of the calibrating resistor 40, included in the circuit by connection to one of its several taps, predetermines each of the several current ranges to which the instrument is to respond, the value $R_A$ of that calibrating resistor for each range is known. Similarly, for any given measuring system, the transmission characteristic $K_{DC}$ will be known and so will the internal resistance $R_s$ of the source of current to be measured. Accordingly, Equation 1 determines the value of each of the detector resistors $R_D$ and respectively comprising resistors 42, 44, 45 and 46. For the No. 1 position of the selector switches 34–36, and particularly contacts 34 and 36, the detector resistor 42 will be high. For a given value of $K_{DC}$ and for a particular value of $R_s$, low relative to resistor 40, the resistor 42 will be infinite (i.e., omitted as required by Equation 1. This will correspond with the minimum value of $R_s$ for which all of the advantages of the present invention will be realized. A desired value of $K_{DC}$ establishes what the parallel resistance of resistors $R_s$ and $R_D$ should be for each range, i.e., each value of $R_A$. Hence when $R_s$ is equal to what the foregoing parallel resistance value should be, $R_D$ will be infinite.

The D.C. transmission characteristic $K_{DC}$ is particularly useful as a measure of the constancy of the sensitivity. Thus, the sensitivity may be defined as the minimum change in input as from the barrier layer cell 10 which will produce rotation of the motor 26 to move the pen index 29 to a new position on its scale 30. Thus, the input signal to the detector 12, i.e., $\Delta V_D$, due to the aforementioned minimum change in input, will produce movement of the pen index 29. Since such a change in the input signal is, of course, developed at the input of the amplifier 24, it will be seen at once that the sensitivity may also be defined in terms of assumed movements of the slidewire contact 13a. More particularly, if it be assumed that contact 13a be moved downwardly from a circuit-balancing position to change the voltage derived therefrom by an amount $\Delta E$ just equal to that value which will develop a change in the input voltage $\Delta V_D$ which will just initiate rotation of motor 26, the sensitivity of the system will be known. From the foregoing, it will be seen that sensitivity may be defined as that fractional change $\Delta E$ of the total slidewire voltage E which will just initiate rotation of motor 26, or that fraction $\Delta I$ of the full-scale current I from the barrier layer cell 10 which will just initiate rotation of motor 26, where in both cases the total slidewire voltage E and the full-scale current I represent values corresponding to movement of pen index 29 from the lower end to the upper end of the scale 30. Thus, the photocell output current at maximum value is the full-scale current I for the measuring system. It is this range which is changed as desired in the manner set forth above. Mathematically, sensitivity may be defined:

$$S = \frac{\Delta E}{E}(100)\% \qquad (2)$$

Sensitivity and the D.C. transmission characteristic are related as follows:

$$K_{DC} = \frac{\Delta V_D}{\Delta E} = \frac{\Delta V_D(100)}{SE} \qquad (3)$$

Though the part $r$ of the precision resistor 40 between point A and contact 34 has been eliminated by the short circuit completed by switch 38, the system will operate satisfactorily with switch 38 open and, in general, switch 38 may be omitted. Thus, in a system in which the connection for short circuiting section $r$ of resistor 40 is not provided, the proportioning of the detector resistors 42–46 will be determined by the following relationship:

$$K_{DC} = \frac{\Delta V_D}{\Delta E} = \frac{R_s R_D}{R_A(R_s + r + R_D) + R_s(r + R_D)} \quad (4)$$

It is to be noted that with the switch 38 open or omitted from the circuit, the resistor $r$ is included in series with the resistor $R_A$ in the above-described first mesh which also includes one of the resistor of $R_D$. A rigorous analysis of Equation 4 would indicate that with $r$ included in said first mesh, the values selected for resistors 42, 44, 45 and 46 of $R_D$ will each be larger than if $r$ were eliminated by switch 38 for equal values of $K_{DC}$, $R_A$ and $R_s$. For practical systems it has been found that the values of said resistors 42, 44, 45 and 46 are realizable and may be of the order appearing in the following table provided as a guide in the practice of the invention.

The table is based on the assumptions that the barrier cell has an internal resistance $R_s$ of 250,000 ohms, the input resistance of the detector 12 is greater than 10 megohms, that $K_{DC}$ is to be 0.167, and that switch 38 is open or omitted.

Table I

| Positions of switches 34–36 | Ohms | | |
|---|---|---|---|
| | $R_A$ | $r$ | $R_D$ |
| 1 | 1 meg | 0 | 1 meg. |
| 2 | 400 K | 600 K | 538 K. |
| 3 | 200 K | 800 K | 367 K. |
| 4 | 100 K | 900 K | 281 K. |
| 5 | 40 K | 960 K | 227 K. |
| 6 | 20 K | 980 K | 208 K. |
| 7 | 10 K | 990 K | 200 K. |
| 8 | 4 K | 996 K | 194 K. |
| 9 | 2 K | 998 K | 193 K. |
| 10 | 1 K | 999 K | 192 K. |

Where "meg."=1,000,000 and "K"=1,000.

In some applications of the present invention, such as in spectroscopy, the input signal will vary quite rapidly, and it is important that the pen index 29 record with considerable accuracy the attainment of the peaks developed by the signal. Since the peak values may require different range settings on the instrument, a constant damping characteristic will be of considerable importance in order that the peaks recorded for the several ranges will appear with corrsponding precision.

In order to achieve a constant damping characteristic for the several positions of the selector switches, the values of the resistor $R_D$ and of the resistor $r$ will for a given resistance $R_S$ of the input source 10 be proportioned as follows:

$$R_{AB} = \frac{R_D(r + R_s)}{R_D + r + R_s} \quad (5)$$

It is to be noted that the total resistance of the range resistor 40, which is $(R_A + r)$, is constant and the resistor is connected across capacitor 22. If now the parallel resistance between points A and B is maintained at a constant value $R_{AB}$, there will be developed a constant damping characteristic for the measuring system for all positions of the selector switches 34–36. An analysis of Equation 5 will suggest that the foregoing requirements have been mathematically stated.

The foregoing objective of providing constant damping may also be achieved by a slightly different mathematical approach which will not for a given damping characteristic result in any values differing from those which will meet the requirements of Equation 5. More particularly, if the alternating signal transmission characteristic between the voltage-varying means, the potentiometer slidewire 13, and the detector resistance means $R_D$ be maintained substantially constant, there will be achieved substantially constant damping. This A.C. transmission characteristic $K_{AC}$ may be expressed as follows:

$$K_{AC} = \frac{R_D(r + R_s)}{(R_A + r)(R_D + r + R_s) + R_D(r + R_s)} \quad (6)$$

Combining Equations 5 and 6, there is obtained the following:

$$K_{AC} = \frac{R_{AB}}{(R_A + r) + R_{AB}} \quad (7)$$

The A.C. transmission characteristic is sufficiently defined for the purposes of this invention by the foregoing Equations 6 and 7 by reason of the fact that the capacitances involved in the circuit remain constant, no provision being made for changing their values. Accordingly, with this assumption, the foregoing Equations 6 and 7 may be considered as defining the conditions which will produce constant damping and which maintain constant the alternating signal transmission characteristics between the voltage-varying means and the detector resistances.

Reference has already been made to the fact that the measuring system of the present invention can be utilized in conjunction with the sources whose outputs may be in the millivolt range and having low internal resistances of the order of several hundred ohms. In order to measure the voltage input from such sources, the knob 37 will operate the selector switches 34–36 in a direction to connect contact 34 with its continuous segment and operate contact 35 to the No. 1$\nu$ position on associated calibrating resistor 41. At the same time, contact 36 will complete a connection to resistor 47 of detector resistance $R_D$ and to which there has also been added the label E to distinguish from the $R_D$ resistors 42, 44, 45 and 46 (additionally labeled I) used for current measurement. With the switches in the described positions, it will be noted that the calibrating resistor 40 remains in circuit in both of the above-described meshes and, accordingly, its value during voltage measurements remains constant. The value $R_B$ of calibrating resistor 41 included in the circuit is variable and has different fixed values depending upon the ranges of voltages to be measured.

In order to achieve constant sensitivity for voltage measurements, an equation quite similar to Equation 1 is utilized, the difference being the substitution in Equation 1 of the value of $R_B$ for the value $R_S$. $R_S$ in the system now being described has already been stated to be small so that it may be neglected. Accordingly:

$$K_{DC} = \frac{R_B R_D}{R_A(R_B + R_D) + R_B R_D} \quad (8)$$

Inasmuch as $R_A$ is a constant for voltage measurements, Equation 8 when satisfied maintains constant the resistance between points A and B of FIG. 3 for a constant value of $K_{DC}$. Accordingly there is concurrently achieved constant sensitivity and constant damping throughout all of the desired voltage ranges, i.e., the A.C. and the D.C. transmission characteristics between the voltage-varying means and the detector resistance means are simultaneously held constant.

Figure 4:
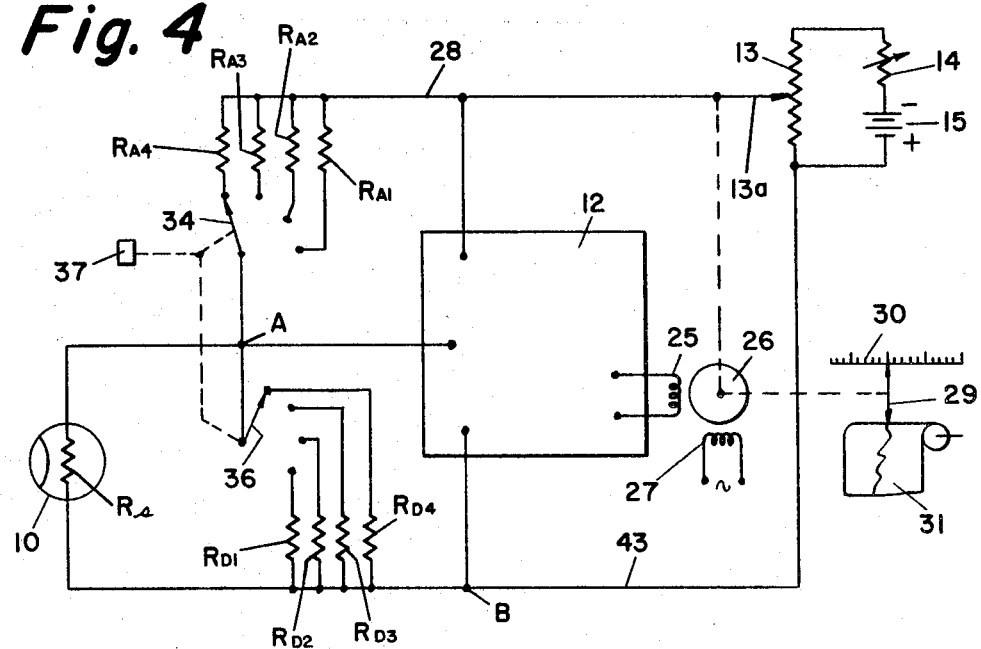
FIG. 4 is a wiring diagram of another embodiment of the invention and including a plurality of elements illustrated in FIG. 3.

In the modification of FIG. 4, the same reference characters have again been used to identify like parts, and it is to be understood that the equations set forth above are applicable. The difference between the modification of FIG. 4 and FIG. 3 resides in the provision of a plurality of separate resistors $R_{A1}$–$R_{A4}$ in place of the four tapped sections of calibrating resistance means 40 of FIG. 3. Thus in the arrangement of FIG. 4, the operation is similar to FIG. 3 with switch 38 in the closed position.

Figure 5:
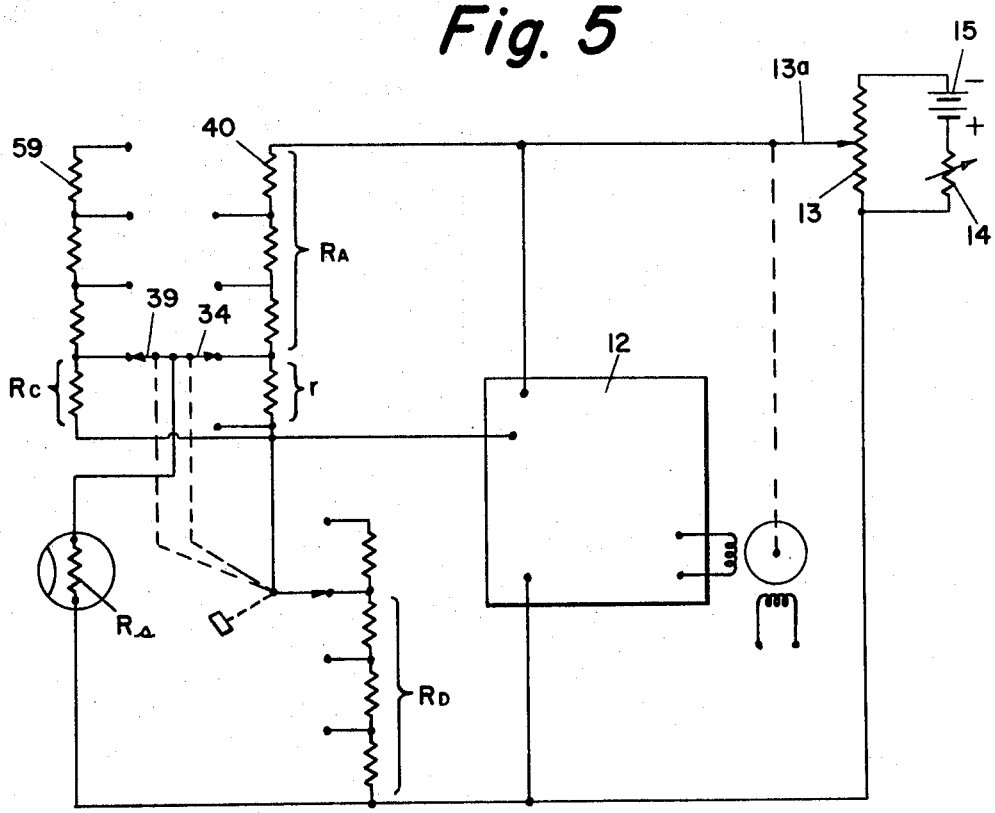
FIG. 5 illustrates a system including features of the present invention.

Referring now to FIG. 5, there has been illustrated the manner in which the above principles of the present invention may be extended to achieve simultaneously constant damping and constant sensitivity throughout a plurality of ranges of current measurement. It will be observed that there has been connected, by operation of switch contact 39, in parallel with the section $r$ of calibrating resistor 40 a section $R_C$ of a compensating resistor 59. If the effective resistance of the section $r$ be properly modified by the parallel connection therewith of the section $R_C$, constancy of both the A.C. and D.C. transmission characteristics will be achieved, as well as constancy of sensitivity and damping for each of the several current ranges. The precise modification of the resistance of section $r$ by the parallel connection therewith of the section $R_C$ to achieve the foregoing objectives may be arrived at as follows:

$$K_{DC} = \frac{R_s R_D}{R_A\left(R_s + \frac{rR_C}{r+R_C} + R_D\right) + R_s\left(\frac{rR_C}{r+R_C} + R_D\right)} \quad (9)$$

Equation 9 is quite similar to Equation 4 where for each term "$r$" in Equation 4 there has been substituted in Equation 9 the parallel resistance value $$\frac{rR_C}{r+R_C}$$

If now the value of $R_C$ be computed to meet the following requirements $$R_C = \frac{rR_s}{R_A} \quad (10)$$

and $R_D$ be computed to meet the following requirements $$R_D = \frac{R_A + r}{N - \frac{R_A}{R_s}} \quad (11)$$

the system will function with constant damping and constant sensitivity throughout the several ranges of current measurement. In Equation 11, N is a constant, selectable on the basis of the desired system damping. For any particular system, the greater the value of N, the greater the amount of damping and the less the sensititivity.

What is claimed is:

1. An electrical measuring system having a plurality of ranges for different levels of input to be measured, comprising
   detector means having an input circuit and an output circuit,
   detector resistance means connected across said input circuit,
   calibrating resistance means,
   a variable source of voltage connected in a first mesh including at least a part of said caibrating resistance means and said detector resistance means,
   connections forming a second mesh including an electrical source the output of which is to be measured, said part of said calibrating resistance means and said variable source of voltage,
   said detector means responding to the difference between two currents, the first from said electrical source the output of which is to be measured, and the second the current flowing in said part of said calibrating resistance means,
   means for changing the magnitude of said part of said calibrating resistance means included in said second mesh to change the range of measurement and for concurrently changing the magnitude of said detector resistance means included in said first mesh in the same direction as the change of said part of said calibrating resistance means included in said second mesh and by that predetermined amount which maintains substantially constant the signal transmission characteristic between said variable source of voltage and said detector resistance means, and
   measuring means connected to said output circuit of said detector means operable in response to its output for adjusting said variable source of voltage in a direction to bring the magnitude of said current flowing through said part of said calibrating resistance means to a value equal to that from said electrical source the output of which is to be measured.

2. The electrical measuring system of claim 1 in which the magnitude of said detector resistance means for each change in the magnitude of said calibrating resistance means for a different range is changed by an amount which maintains substantially constant the direct current signal transmission characteristic between said variable source of voltage and said detector resistance means, thereby to maintain constant for the several ranges the incremental change of said output applied to said detecting means by equal incremental changes of the voltage of said variable source.

3. The electrical measuring system of claim 1 in which said detecting means includes an RC filtering network in its input circuit,
   capacitance damping means connected between said variable source of voltage and said detecting means for applying to said detecting means a damping signal proportional to the rate of change of said variable source of voltage, and in which for a predetermined change of said part of said calibrating resistance means for establishment of a selected range of measurement the magnitude of said detector resistance means is changed in the same direction and by that amount which maintains substantially constant for the several ranges the alternating signal transmission characteristics between said voltage-varying means and said detecting means to maintain constant the magnitude of said damping signal for corresponding rates of change of said variable source of voltage.

4. The electrical measuring system of claim 1 in which said calibrating resistance means comprises at least one precision resistor with an adjustable connecting means associated therewith for adjusting the fraction of said precision resistor included within said second mesh for establishing said selected ranges of measurement.

5. The electrical measuring system of claim 4 in which the whole of said calibrating resistance means is included in series in said first mesh for all positions of said adjustable means.

6. The electrical measuring system of claim 4 in which that part of said calibrating resistance means included in said second mesh is the only part included in said first mesh.

7. The electrical measuring system of claim 1 in which said calibrating resistance means comprises a plurality of precision resistors, and in which said detector resistance means comprises a plurality of resistors, said means for changing the magnitudes of said resistance means comprising movable contacts for concurrently connecting selected pairs of said calibrating and detector resistors respectively in said meshes.

8. The electrical measuring system of claim 1 in which said detector resistance means comprises a plurality of resistors of predetermined value, and in which said calibrating resistance means includes at least one precision resistor with a plurality of taps, said means for changing their magnitudes comprising switch contacts concurrently movable to predetermine the magnitude of that part of said calibrating resistor included in said second mesh and the particular one of said detector resistors connected in said first mesh.

9. An electrical measuring system having a plurality of ranges for different levels of input to be measured, comprising
   detector means having an input circuit with terminals A and B and an output circuit,
   detector resistance means $R_D$ connected across said input circuit,
   calibrating resistance means,
   a variable source of current connected in a first mesh including at least a part $R_A$ of said calibrating resistance means and said detector resistance means, connections forming a second mesh including an electrical source the output current of which is to be measured, said part of said calibrating resistance means and said variable source of current, said electrical source having a resistance $R_s$, said detector means responding to the difference between two currents, the first from said electrical source the output of which is to be measured, and the second the current flowing in said part of said calibrating resistance means, means for changing the magnitude of said part of said calibrating resistance means included in said second mesh to change the range of measurement and for concurrently changing the magnitude of said detector resistance means included in said first mesh in the same direction as the change of said part of said calibrating resistance means included in said second mesh and by that predetermined amount which maintains substantially constant the signal transmission characteristic K between said variable source of current and said detector resistance means, and measuring means connected to said output circuit of said detector means operable in response to its output for adjusting said variable source of current in a direction to bring the magnitude of said current flowing through said part of said calibrating resistance means to a value equal to that from said electrical source the output of which is to be measured.

10. The electrical measuring system of claim 9, in which the direct current signal transmission characteristic $K_{DC}$ is maintained substantially constant by that predetermined change of said detector resistance means $R_D$ which for each said change in said part $R_A$ of said calibrating means satisfies the following relationship:

$$K_{DC} = \frac{R_s R_D}{R_A(R_s + R_D) + R_s R_D}$$

11. The electrical measuring system of claim 9, in which said calibrating resistance means has a part $R_A$ always included in said second mesh and a remaining part $r$ always included in series with said first mesh, and in which the direct current signal transmission characteristic $K_{DC}$ is maintained substantially constant by that predetermined change of said detector resistance means $R_D$, which for each said change in said part $R_A$ of said calibrating means satisfies the following relationship:

$$K_{DC} = \frac{R_s R_D}{R_A(R_s + r + R_D) + R_s(r + R_D)}$$

12. The electrical measuring system of claim 9, in which said calibrating resistance means has a part $R_A$ always included in said second mesh and a remaining part $r$ always included in series with said first mesh, and in which the alternating current signal transmission characteristic $K_{AC}$ is maintained substantially constant by that predetermined change of said detector resistance means $R_D$ which for each said change in said part $R_A$ of said calibrating means satisfies the following relationship:

$$K_{AC} = \frac{R_D(r + R_s)}{(R_A + r)(R_D + r + R_s) + R_D(r + R_s)}$$

References Cited by the Examiner

UNITED STATES PATENTS 2,547,105 4/1951 Williams _____ 324—100
2,656,498 10/1953 Goodwin _____ 324—115

WALTER L. CARLSON, *Primary Examiner.*

FREDERICK M. STRADER, *Examiner.*

D. R. GREENE, J. MULROONEY, *Assistant Examiners.*